United States Patent [19]

Aoshima et al.

[11] Patent Number: 4,668,761

[45] Date of Patent: May 26, 1987

[54] HIGH STRENGTH, HIGH MODULUS POLYMERIC MATERIAL IN CONTINUOUS LENGTH, PROCESS FOR PRODUCTION THEREOF AND DEVICE THEREFOR

[75] Inventors: Atsushi Aoshima, Yokohama; Tamikuni Komatsu; Sachio Enoki, both of Fuji, all of Japan

[73] Assignee: Asahi Kasei Kogyo Kabushiki Kaisha, Osaka, Japan

[21] Appl. No.: 704,866

[22] Filed: Feb. 25, 1985

[30] Foreign Application Priority Data

| Feb. 29, 1984 | [JP] | Japan | 59-38398 |
| Feb. 29, 1984 | [JP] | Japan | 59-38399 |
| Mar. 16, 1984 | [JP] | Japan | 59-49338 |
| Apr. 11, 1984 | [JP] | Japan | 59-72029 |

[51] Int. Cl.$^4$ .............................................. C08G 4/00
[52] U.S. Cl. ..................................... 528/230; 264/557; 264/562; 264/567; 264/570
[58] Field of Search ............... 264/557, 562, 567, 570; 528/230

[56] References Cited

U.S. PATENT DOCUMENTS

| 3,134,636 | 5/1964 | Singleton | 528/230 X |
| 3,479,314 | 11/1969 | Williams | 528/230 X |
| 4,111,023 | 9/1978 | Moreau | 264/557 X |
| 4,195,158 | 3/1980 | Burg et al. | 528/230 |
| 4,356,143 | 10/1982 | Hill et al. | 264/557 |

FOREIGN PATENT DOCUMENTS 53-141371 12/1978 Japan .

OTHER PUBLICATIONS

Polymer Engineering and Science, vol. 8, No. 4, Oct. 1968, pp. 290–301.
Polymer Engineering and Science, vol. 14, No. 10, Oct. 1974, pp. 682–686.
Journal of Applied Polymer Science, vol. 26, 1981, pp. 2879–2896.

*Primary Examiner*—Lucille M. Phynes
*Attorney, Agent, or Firm*—Birch, Stewart, Kolasch & Birch

[57] ABSTRACT

A polyacetal copolymer of continuous length is disclosed. The copolymer has an apparent density of 1.20 to 1.46 g/cm$^3$, and a tensile modulus (X) of 19 GPA or more and a density change percentage (Y) of 85% or more. The relationship between the density change percentage (Y) and the tensile modulus (X) is defined by the following relationship:

when $19 \leq X \leq 30$, then $Y \geq 127.7 - 1.42X$, and when $X > 30$, $Y \geq 85$.

A method for producing this copolymer includes permitting a polymeric material in continuous length to pass through a pressurizing fluid and applying a substantially uniform pressure therearound. A drawing stress is applied to the material while heating it at a temperature not above its softening point, thus subjecting the material to high stretching.

13 Claims, 33 Drawing Figures

HIGH STRENGTH, HIGH MODULUS POLYMERIC MATERIAL IN CONTINUOUS LENGTH, PROCESS FOR PRODUCTION THEREOF AND DEVICE THEREFOR

TECHNICAL FIELD

The present invention relates to a polymeric material of high strength and high modulus, a process for producing the same and a device therefor. More specifically, the present invention pertains to a process for producing a polymeric material in continuous length of high strength and high modulus by stretching while preventing fibrilation and to a device used therefor. Further, the present invention pertains to a polyacetal of continuous length which is dense and high in modulus and strength by employing the process and the device of the present invention.

BACKGROUND ART

It is well known and frequently practiced in the art to stretch a polymeric material of continuous length such as a synthetic fiber to effect molecular orientation therein to improve physical properties such as mechanical strength, etc. Generally speaking, however, in many polymeric materials, improvement of physical properties such as tensile strength, tensile modulus, flexural strength, buckling strength, etc. cannot sufficiently be effected even if they may be subjected to stretching. For example, there has been proposed, for making a higher modulus of polyacetal, a two-step stretching method, in which polyacetal is stretched twice while being heated under normal pressure (Poly. Eng. & Sci., Vol. 14, No. 10, p. 682). This method, however, is not practically applied because of the low maximum value of the modulus reached, generation of voids and fibrils and the drawback of its difficult applicability to rods or tubes with larger diameter. The microwave heating stretching method has also recently been proposed (Japanese Laid-open Patent Publication No. 208216/1982), but generation of voids and fibrils could not be prevented and the modulus attained was not satisfactory. As one method for inhibiting voids accompanied with such stretching, it may be considered to carry out working under a high hydrostatic pressure. For example, it was attempted to place a test piece of polyacetal in a sealed vessel and stretch at room temperature under a high hydrostatic pressure, but fracture occurred before reaching the yield point, or the product obtained by discontinuing stretching before fracture was found to have no improved physical properties (Poly. Eng. & Sci., Vol. 8, No. 4, p. 290). It has also been known to extrude polyacetal under hydrostatic pressure and perform stretching through a dice (J. Appl. Polym. Sci. Vol. 26, p. 2879), but formation of voids and fibrilation occurs during stretching, so that no high strength and high modulus can be attained As another proposal, a test piece of polyacetal or other plastics previously stretched to such a low extent as to effect molecular orientation was placed in a sealed vessel, heated to a temperature higher than the softening point thereof and pressurized under hydrostatic pressure, thereby improving thermal stability and transparency (Japanese Laid-open Patent Publication No. 141371/1978). According to this method, no high stretching is possible to thus make it impossible to attain a high modulus. Moreover, limitations with respect to the shape of the applicable molded article cannot be avoided.

Attempts have also been made to improve the physical properties of polyacetal or polyethylene, by placing such a polymer in a sealed vessel and carrying out dice extrusion by application of high hydrostatic pressure from one end (J. Appl. Polym. Sci., Vol 26, 2877–2896; J. Polym. Sci., Vol. 16, 2031-2047; J. Mater. Sci., Vol. 10, 1105). However, the product obtained is low in modulus attained even by high stretching, and a high pressure of several tons/$cm^2$ or higher is required. Besides, the process has a low extrusion speed and is batch, and thus it can hardly be deemed practical.

In addition, although the working method under hydrostatic pressure of the prior art as described above, which is the treatment in a laboratory to apply a pressure treatment batchwise on a test material in a sealed system, can be easily performed with relative ease without taking out the test material, it has not yet been realized in an operation of a large scale production where a material of continuous length must be treated continuously, because of the difficulty in a device to provide openings for the introducing and withdrawing of the material in continuous length and to maintain the pressure internally applied.

The present inventors have made various studies to determine the causes for insufficient improvement of tensile strength and tensile modulus in the methods of the prior art. Consequently, it has now been found that, in most polymeric materials, high stretching to the extent so as to give high modulus cannot be done, and yet simultaneously with the orientation of the polymers at stretching generation of voids and fibrilation actually occurs, whereby the polymers tend to be readily bursted in the stretched direction to be lowered not only in mechanical strength in the stretched direction, but also in flexural strength and buckling strength in the transversal direction. Accordingly, it has been found that marked improvement can be made only if stretching can be performed at a high stretching ratio while preventing generation of voids and fibrilation. On the basis of this knowledge, further studies were continued for development of a method for stretching a polymeric material to a high ratio so as to achieve a high modulus without fibrilation, to find that the purpose can be achieved by stretching while applying direct pressure with a fluid and heating and to invent a device for carrying out the process continuously, thus obtaining the present invention.

DISCLOSURE

Figure 1A:
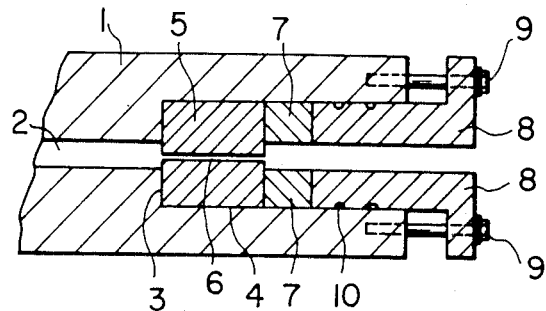
FIGS. 1(a), 1(b) and 1(c) are cross-sectional views of respective examples of the device of the present invention according to a gland box system, 1(a) and 1(b) showing longitudinal cross-sections and 1(c) a transverse cross-section.

The present invention, in a first aspect, provides a process for producing a polymeric material in continuous length of high strength and high modulus, which comprises allowing a polymeric material in continuous length to pass through a pressurizing fluid, to apply substantially uniform pressure therearound, and applying a drawing stress to the material while heating it at a temperature not exceeding its softening point, thus subjecting the material continuously to high stretching.

The present invention, in a second aspect, provides a device for continuously pressurizing and stretching a polymeric material in continuous length having a pressure vessel filled with a pressurizing fluid, provided at one end thereof with an inlet for introducing a polymeric material and an outlet at the other end thereof for withdrawing the polymeric material, provided on the introducing inlet side with an inlet for feeding the pressurizing fluid or an outlet for discharging the pressurizing fluid and on the withdrawing outlet side with an outlet for discharging the pressurizing fluid or an inlet for feeding the pressurizing fluid, and also provided with a means for stretching to provide a drawing stress to the polymeric material in continuous strength moving continuously through the pressure vessel, the introducing inlet and withdrawing outlet having structures which can allow the material in continuous strength to pass therethrough smoothly but does not bring about substantial lowering in pressure within the pressure vessel.

In a third aspect, the present invention also provides a copolymer of polyacetal of continuous length, having an apparent density of 1.20 to 1.46 g/cm$^3$, a tensile modulus of 19 GPa or more and a density change percentage of 85% or more.

Further, the present invention provides, in a fourth aspect, an acetal homopolymer of continuous length, having an apparent density of 1.20 to 1.46 g/cm$^3$, a tensile modulus of 25 to 50 GPa and satisfying the relationship: $Y \geq 110 - 0.5X$, wherein Y is the density change percentage (%) and X is the tensile modulus (GPa).

In the process of the present invention, two modes of pressurization may be contemplated.

According to one embodiment, a polymeric material of continuous length is pressurized from the outside thereof with a pressurizing fluid, while the other embodiment comprises pressurizing the polymeric material in continuous length from the inside thereof with a pressurizing fluid. Of course, it is possible to pressurize both the outside and inside of the material The method to apply pressurization from the outside may be accomplished by filling a fluid around the outside of the material in continuous length and pressurizing the fluid by means of a compressor, etc. In this case, isotropic pressurizing force acts from outside of the material in continuous length, and it has unexpectedly been found that the pressurizing force can reduce the stretching stress. According to this method, when a hollow polymeric material is employed, the hollow portion is collapsed to give a solid material Of course, by controlling the pressurizing force, the size of the hollow portion can be changed freely. Therefore, according to this method, it is also possible to coat wires, optical fibers, etc. tightly with such a material.

On the other hand, in the method to apply pressurization from the inside, the polymeric material is required to be hollow, and pressurization is accomplished by filling the hollow portion with a fluid. In this case, the hollow portion can be brought to a pressurized state by positively introducing a pressurizing fluid into the hollow portion or by heating the hollow portion or applying heating or pressurization from the outside under the state where both ends of the material filled with a fluid are closed. As such a device, for example, there is a device in which one end of an unstretched material is connected to a compressor.

According to the method wherein pressurization is applied from the inside, since the pressure in the hollow portion of the polymeric material can be made higher than the outside pressure, when a drawing stress is applied under such conditions, a hollow product oriented not only in the direction of drawing stress but also isotropically in the directions perpendicular thereto can be obtained, and therefore such a method may be preferably applicable for production of pipes, tubes or films of high strength and high modulus. Also, by controlling the conditions, it is possible to make the outer diameter and inner diameter after stretching larger or smaller than before stretching.

The fluid as herein mentioned is a material which is inert to the polymeric material employed and exhibits fluidity at the stretching temperature. As the fluid to be used for pressurization of the polymeric material, a liquid is generally used, since it is easy in handling and operation for pressurization, and also good in thermal conductivity for heating If desired, it is also possible to use a gas. Examples of such liquids may include silicone oil, mineral oil, vegetable oil, glycerine, grease, polyethylene glycol, polyethylene, paraffin oil, wax, water, etc. Examples of gases may include inert gases such as nitrogen, argon, neon, helium, etc., air, carbon dioxide and steam. And, the fluid may be chosen depending on the polymeric material employed.

In the process of the present invention, such a fluid is pressurized in a substantially sealed vessel by means of a compressor, etc., or alternatively a fluid pressurized in a separate place is brought into contact with the polymeric material of continuous length by circulation to a predetermined treatment zone to apply pressurization thereon. During this operation, a liquid in a fluid state can advantageously be brought into contact with the polymeric material of continuous length, since pressurizing force can act isotropically on the material of continuous length, whereby stretching under uniform pressure is rendered possible. If a fluid previously heated is employed, the material of continuous length can be advantageously heated uniformly to enable uniform stretching. In the process of the present invention, the treatment pressure may be generally 10 to 1000 Kg/cm$^2$, preferably 30 to 800 Kg/cm$^2$. By employing a pressure less than 10 Kg/cm$^2$, the effect of the pressure is undesirably small. In general, the improvement effect of physical properties tends to be greater as the pressure is higher, but such an improvement effect will level of at pressures of 1000 Kg/cm$^2$ or higher.

In the process of the present invention, the temperature during stretching is also important, and it is necessary to perform stretching at a temperature not exceeding the softening point of the polymeric material under the particular pressure during stretching. The softening point will be elevated in the same material with the increase of pressure. Although stretching may be possible even at a temperature higher than the softening point, molecular orientation does not proceed sufficiently, resulting unfavorably in marked lowering in modulus. The lower limit of the heating temperature depends on the polymeric material and is not particularly limited, but it is generally preferred to employ a temperature of about 70° C. or higher.

As the heating method, it is possible to use the method in which a pressurizing fluid is previously heated and brought into contact with the polymeric material; the method in which the zone where the fluid comes into contact with the polymeric material is heated from the outside; and the method wherein the polymeric material is heated before introduction. For such heating, any desired conventional means may be available, including heating by means of an electrically heated wire, heating by use of a heating medium of gas, liquid or solid, radiation heating by far infrared rays or infrared rays. Further, the heating by electromagnetic waves before stretching of the polymeric material may be adopted as a previous heating thereof.

In the process of the present invention, it is necessary to highly stretch a polymeric material of continuous length in the state wherein the polymeric material is pressurized uniformly through the fluid existing therearound and heated to a temperature not exceeding its softening point. And, for marked improvement of the modulus, it is required to perform high stretching to a region exceeding the natural stretching ratio region. The limit of high stretching, which differs depending on the polymeric material employed, should be determined individually.

Non-limitative examples of the polymeric material, to which the process of the present invention is applicable, may include crystalline plastics such as polyoxymethylene (conventionally called as polyacetal), polyethyleneterephthalate, polybutyleneterephthalate, nylon 6, nylon 66, nylon 12, polyethylene, polypropylene, polytetrafluoroethylene, polyvinylalcohol, etc., amorphous plastics such as polymethyl methacrylate, polyacrylonitrile, polyvinyl chloride, polyvinylidene chloride, polyvinylidene fluoride, polycarbonate, etc., heat resistant polymers such as polysulfone, polyether sulfone, polyarylsulfone, polyether ether ketone, polyoxybenzylene, polyphosphazene, polyarylphenol, etc., aromatic polyamides and imides such as poly(m-phenyleneterephthalamide), poly(p-phenyleneterephthalimide), poly(p-phenyleneterephthalamide), polybenzimidazole, polyimidazopyrrone, polyamideimide, polyetherimide, poly(p-phenylenebenzobisthiazole, etc. These polymeric materials of continuos length may be formed in any desired shape, for example, filament, film, tape, sheet, plate in continuous length, tube, round rod, square rod, shape in continuous length with any profile cross-section.

In the device for practicing the process of the present invention, according to a preferred embodiment, at least the withdrawing outlet is made to have a structure which can freely be controlled depending on the gap formed by the material in continuous length passing therethrough and the innerside wall thereof.

According to another preferred embodiment of the device, the cross-section of at least the withdrawing outlet is made to have a structure, which may allow a small amount of the pressurizing fluid to be leaked out through the gap formed by the material of continuous length passing therethrough and the innerside wall thereof but will bring about no substantial lowering in pressure within the pressure vessel.

The device for realizing the process of the present invention consists primarily of a pressure vessel and a stretching means. The main body of the pressure vessel is not particularly limited but may be made of any material and shape, provided that it can stand the required treatment pressure. With respect to pressure resistance, durability, treatment efficiency, etc., however, it is advantageous to employ a cylindrical vessel or pillar vessel made of a high strength anti-corrosive metal. Examples of such a metal may include stainless steel, chromium steel, nickel steel, SCM steel and iron steel.

Figure 8:
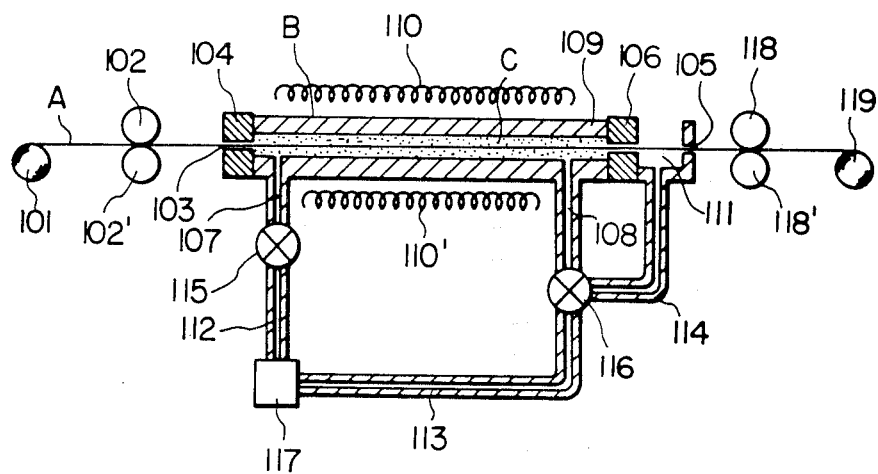
FIG. 8 and FIG. 9 are cross-sections of the whole devices of the present invention under exemplary practical operations.
Figure 9:
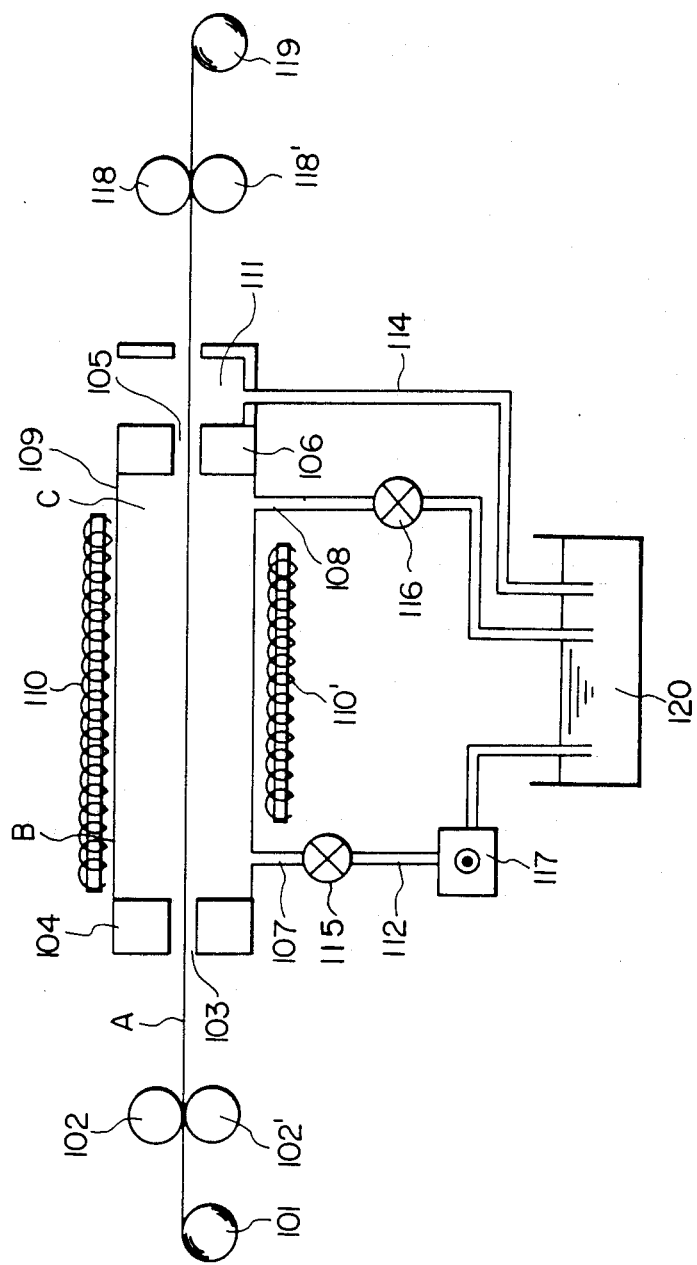

The pressure vessel of the present invention is provided at a suitable position with a hole for feeding a pressurizing fluid, which supplements a pressurizing fluid for compensating for lowering in pressure occurring during the stretching treatment. It is also possible to provide a hole for discharging the fluid in order to continuously feed and discharge the pressurizing fluid. Such feeding and discharging of the pressurizing liquid may be conducted independently of each other. However, from the viewpoint of effective utilization of energy, as shown in FIG. 8 and FIG. 9, it is preferable to adjust the fluid discharged to a necessary pressure by using, if desired, a control valve or a compressor, before circulating it to the feeding inlet. The flow direction of the pressurizing fluid may be in parallel with the direction in which the polymeric material in continuous length is transferred or opposite thereto, but the latter counter-flow is preferable in view of thermal efficiency. Also, if desired, it is possible to provide a means for controlling the temperature of the pressurizing fluid such as a heater or a cooler, or a means for controlling the flow rate at or in the vicinity of the feeding inlet or the discharging outlet. Additionally, there may also be provided control valves for pressure control on the pressure vessel or the circulation route as auxiliary means for pressure control. Next, as for the stretching means, any desired means may be selected from among those conventionally used in the stretching of polymeric materials of continuous length. Ordinarily, however, a combination of a feed roll and a draw roll is used. Otherwise, a belt system or a catapillar system may also be employed.

In this connection, in FIG. 8 and FIG. 9, 101 represents a delivery roller; 102, 102' a feed roller; 103 an introducing inlet; 104 a pressure maintenance member; 105 a withdrawing outlet; 106 a pressure maintenance member having a withdrawing outlet; 105, 107 a hole for feeding fluid; 108 a hole for discharging fluid; 109 a cyrindrical vessel; 110, 110' a heater; 111 a section for gathering a fluid; 112, 113, 114 a pipe; 115, 116 a pressure control valve; 117 a compressor; 118, 118' a withdrawing roller; 119 a wind-up roller; 120 an accumulator; A a polymeric material in continuous length; B a pressurizing stretching device; and C a pressurizing fluid.

The main body of the pressure vessel is provided with an introducing inlet and a withdrawing outlet for the polymeric material of continuous length on the confronting position through excavation, and the polymeric material of continuous length is transferable through these while being applied with a drawing stress. The introducing inlet and withdrawing inlet have structures so that the material of continuous length may pass therethrough smoothly, and yet the pressure applied on the inner portion within the pressure vessel may be maintained. The structures can be classified into two categories. The first structure is a structure which is freely controllable so as to be adapted to the cross-sectional shape and the dimension of the material in continuous length passing therethrough. The structure may be employed at the introducing inlet or the withdrawing outlet. However, this is particularly required at the outlet for taking out the polymeric material of continuous length, since the material in continuous length is stretched within the vessel to become different in the shape of the cross-section and dimension from the original one. The shape and the dimension of the outlet after controlling should be made such that the stretched material of continuous length can pass therethrough with small frictional resistance, but there occurs substantially no leak out of the pressurizing fluid within the vessel, or a small amount of the fluid may be allowed to be leaked out or flown out. More specifically, the shape of the outlet is made similar to the shape of the cross-section of the material of continuous length, and its size is made wider by a gap of 0.00005 to 2.0 mm from the peripheral of the material. Even in the case when the pressurizing fluid may be leaked out or flown out, only if its amount is small, pressure maintenance can easily be done by increasing the flow rate of the fluid introduced into the pressure vessel. As the gap is smaller, the pressure can be maintained and the amount of the pressurizing fluid flown out may be small, but when the gap is made larger, the pressure can be maintained by allowing a fluid with higher viscosity to be flown out. The multiple of devices may be employed by connecting them depending upon the purpose.

For the structure of this withdrawing outlet, there may be employed the so called gland box system, in which an elastic block having a through-hole is shortened or enlarged in the dimension of the thru-hole by applying or releasing pressure in the axis direction of the thru-hole or thru-slit, in the direction perpendicular to the axis or all around the elastic block; the nozzle system having a controllable opening in which a convergent cylindrical tube provided with splits at several places at the tip end opening is provided on its outside with thread grooves and fitted with a covering fitment provided internally with threads, and the opening is controlled by screwing the covering fitment; the so called slit system having a controllable opening in which a pair of members to be fitted so as to form a required gap are fitted closely together and the gap is controlled with a screw, etc.; and the so called nozzled or slit system having a fixed opening in which a member having an opening with required shape and dimension is inserted at the opening portion having a predetermined shape and dimension.

Figure 1B:
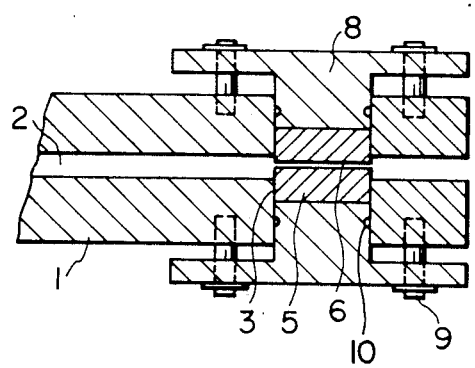
Figure 1C:
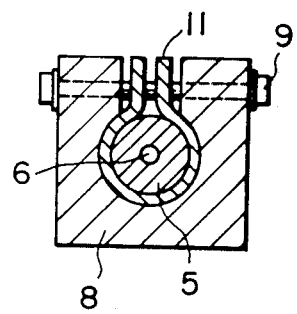

FIGS. 1(a) and 1(b) are longitudinal cross-sectional views of different examples of the structure of the gland box system, and FIG. 1(c) is a transverse cross-sectional view. In FIGS. 1(a) and 1(b), the cavity portion 2 in the main body 1 of the sealed vessel forms a portion 4 for mounting a pressure maintenance member enlarged in diameter at the outside part through the stepped portion 3, and into the stepped portion 3 is fitted an elastic block 5 in contact therewith. The elastic block 5 is provided with a thru-hole or thru-slit 6 for passing a material of continuous length. In FIG. 1(a), the elastic block 5 is fixed through a spacer 7 by a push-in flange 8 slidable back and forth by the screws 9, 9. And, when the push-in flange 8 is moved so as to be pushed toward the innerside by the screws 9, 9, the elastic block 5 is compressed through the spacer 7 to reduce the diameter of the thru-hole or thru-slit. On the contrary, when the push-in flange 8 is moved so as to be withdrawn outwardly, the elastic block 5 is expanded to enlarge the diameter of the thru-hole or thru-slit. As shown in FIG. 1(b), it is also possible to control the diameter of the thru-hole or thru-slit by application of an external force in the direction perpendicular to the axis of the thru-hole or thru-slit in the elastic block 5. Alternatively, as shown in FIG. 1(c), the diameter can be controlled by applying an external force all around the elastic block 5 by throttling of the throttling member 11 by the throttling screw 9.

Figure 10:
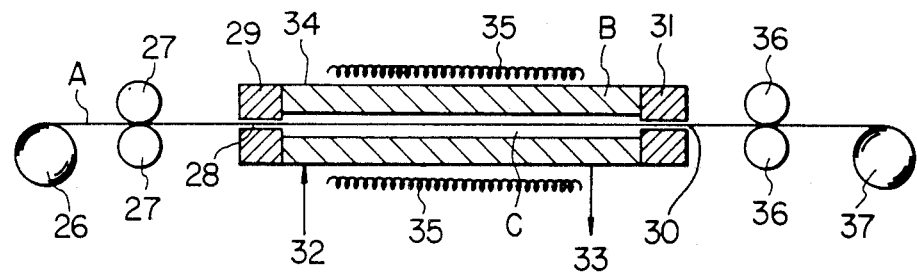

Such an elastic block may be made of a material, which is not particularly limited, provided that it is more or less elasticity deformable by an external force, as exemplified by rubber, plastic, leather, asbestos, alloy, etc. The elastic block may be made of a single material, or otherwise a plural number of elastic blocks with different kinds or with different sizes of thru-holes or thru-slits may be combined. The shape of the opening of the elastic block 5 may be designed as desired in conformity with the polymer passed therethrough. In FIG. 1(a), 10 is an O-ring provided for ensuring air tightness and liquid tightness.

Figure 2:
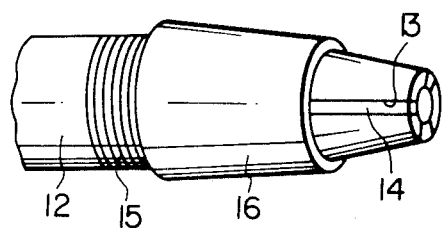
FIG. 2 is a perspective view showing an example of the nozzle system having a controllable opening.

Next, FIG. 2 is a perspective view of an example of a nozzle having a controllable opening. The tip portion of the main body of a cylindrical withdrawing outlet 12 is formed in a converged shape and provided at its tip with splits 13, of a certain width where packings 14, made of an elastic material are embedded. Also, on the external surface of the tip portion is engraved a tapered thread groove 15, and a covering fitment 16 having a corresponding thread on its inner surface is fitted thereover. And, when the covering fitment 16 is screwed in, the splits 13 will be throttled to be reduced in opening, while the opening will be enlarged by the restoring action of the packings 14, when the covering fitment is loosened.

Figure 3A:
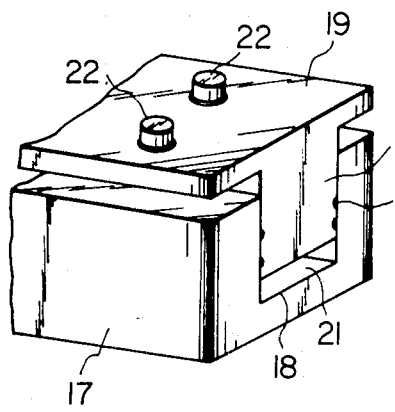
FIGS. 3(a) and FIG. 3(b) illustrate respective examples of the slit system having a controllable opening, FIG. 3(a) showing a perspective view and 3(b) a transverse cross-sectional view.
Figure 3B:
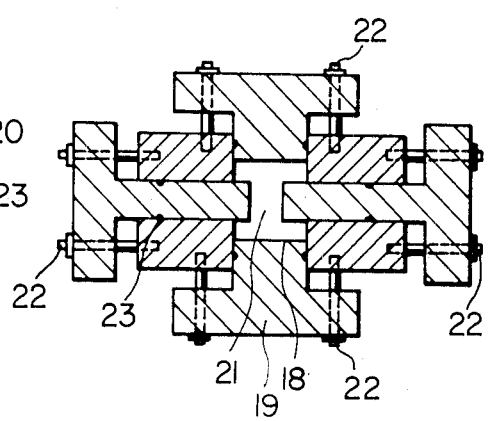

Further, FIG. 3(a) is a perspective view of an example of the split system having a controllable opening, and FIG. 3(b) is a transverse cross-sectional view of another example. FIG. 3(a) is composed of a pair of members of a main body 17 having a groove 18 and a flange 19 having a leg portion 20 fittable closely into the groove to form a necessary slit 21. The slit cannot be variable in its width, but its depth can be varied by the control screws 22, 22. The screws 23, 23 in the Figure are O-rings for enhancing air tightness and liquid tightness. Particularly, in FIG. 3(b), the width and the depth of the slit 21 are made controllable by the control screws 22 of the flanges 19 equipped up and down and at both sides of the slit.

Figure 5:
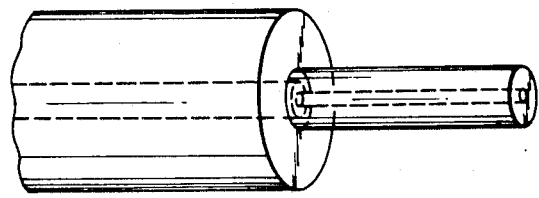
Figure 6:
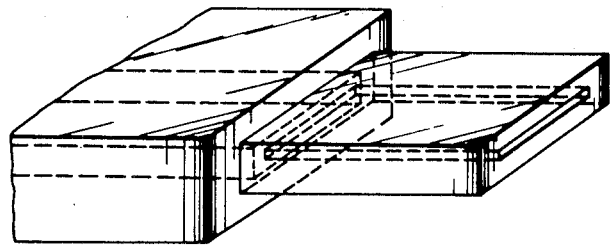
FIG. 6 is a perspective view of an example of the slit system having a fixed opening.

Referring now to the second structure, the withdrawing outlet and/or the introducing inlet are made to have an opening adequately controlled so that pressure maintenance may be possible through the pressure loss when a small amount of a fluid is allowed through the gap created between the opening and the material of continuous length passing therethrough. This may be determined by considering the viscosity of the fluid employed and the pressure within the pressure vessel, but practically it is done by setting the gap created between the introducing inlet or the withdrawing outlet and the material of continuous length passing therethrough at a range of from 0.00005 to 2.0 mm. FIG. 5 is a perspective view showing an example of the structure of withdrawing outlet, which consists of a nozzle having a fixed opening bound to a thick cylindrical vessel 9. Also, depending on the shape of the material to be stretched, the nozzle portion may be made a fixed slit as shown in FIG. 6.

Figure 4A:
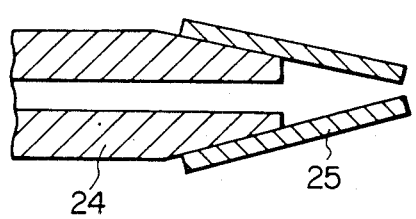
FIGS. 4(a), FIG. 4(b) and FIG. 5 are respective examples of the nozzle system having a fixed opening, FIGS. 4(a) and 4(b) showing longitudinal cross-sections and FIG. 5 showing a perspective view.
Figure 4B:
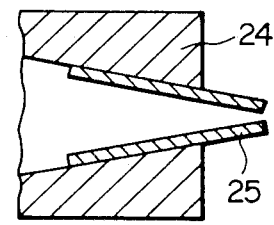

Next, FIGS. 4(a) and FIG. 4(b) are cross-sectional views showing examples of another nozzle system having a fixed opening, FIG. 4(a) showing an example of the externally fitted type and FIG. 4(b) an example of the internally fitted type. That is, according to this system, a taper is provided at the tip portion of a nozzle body 24 and an opening of a desired shape and dimension is obtained by fitting an auxiliary nozzle 25 having an inner face or an outer surface fittable to this taper.

The auxiliary nozzle 25 may also be exchanged with another suitable one to give a desired shape and dimension of the outlet.

The structure of the withdrawing outlet of the device according to the present invention is not limited to the systems as mentioned above, but any other structure may be available, which can be controlled depending upon the shape and dimension of the cross-section of the polymer material of continuous length.

Figure 7:
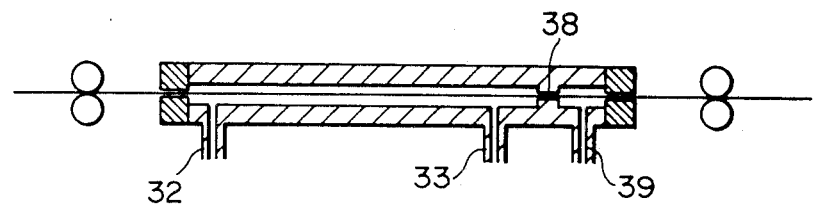
FIG. 7, FIG. 10 and FIG. 11 are illustrations for explanation of the whole structure of the devices of the present invention.

FIG. 7 shows a cross-sectional view for an embodiment of the device of the present invention, wherein pressurizing fluid is allowed to be flown out partially from the discharging outlet. In this embodiment, the pressure vessel is internally divided partially by a partition wall 38 on the outlet side, and the pressurizing fluid is supplemented from the auxiliary inlet 39 provided at this portion to maintain the inner pressure at a desired level. In this case, usually, a fluid of higher viscosity is supplied from the auxiliary inlet 39 to make the flow rate of the fluid flow out from the withdrawing outlet smaller, whereby pressure maintenance can be easier.

Figure 11:
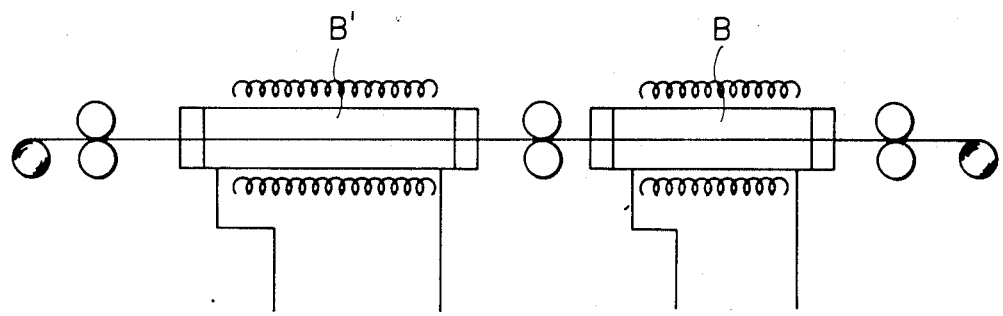

Referring next to FIG. 10, which is a cross-sectional view of an example of the device of the present invention, the polymeric material A of continuous length is fed from the delivery roller 26 through the feed rollers 27 to the pressurizing stretching device B. The material of continuous length may be fed in plural numbers. The stretching device is composed of a cylindrical vessel 34 provided with a pressure maintenance member 29 having an introducing inlet 28 and a pressure maintenance member 31 having a withdrawing outlet 30 at both ends, and also provided with an inlet for feeding fluid 32 on the introducing inlet side and an outlet for discharging fluid 33 on the withdrawing outlet side, respectively, and the vessel is filled with a pressurizing fluid C. The material of continuous length A is subjected to a stretching treatment while being pressurized by the pressurizing fluid C under a required pressure when passing through the pressurizing stretching device B, and also being heated through the pressurizing fluid by heaters 35, 35 arranged outside of the cylindrical vessel 34, and thereafter taken out and wound up through the withdrawing rollers 36, 36 on the wind-up roller 37. Here, the introducing inlet and the withdrawing outlet provided on the pressure maintenance members 29 and 31 have the structure as firstly described above and/or the structure as secondly described above. Two or more of the devices as shown in FIG. 10 may also be combined conveniently as shown in FIG. 11 depending on the purpose.

Figure 12:
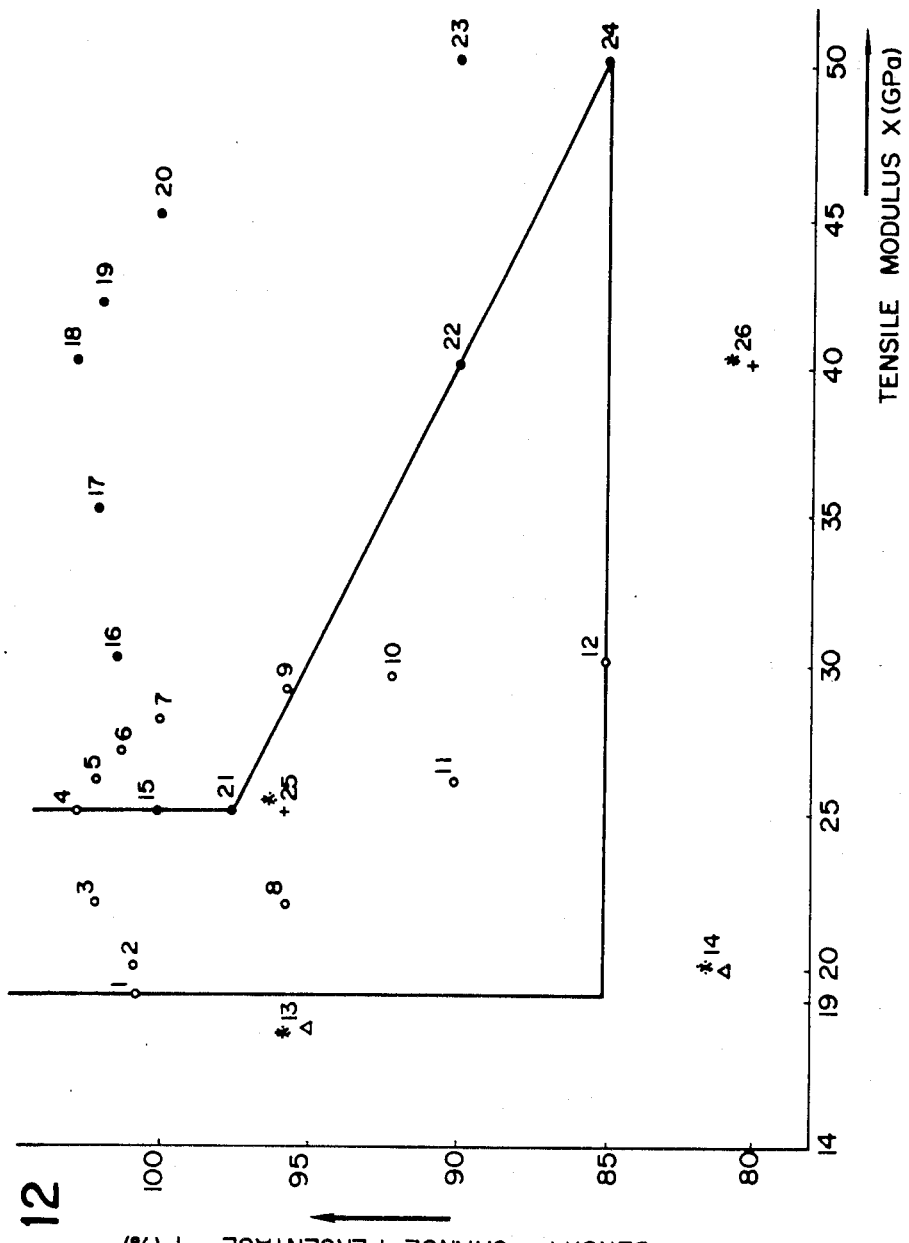
FIG. 12 is a graph showing the relationship between the tensile modulus X (GPa) and the density change percentage Y (%)
Figure 13A:
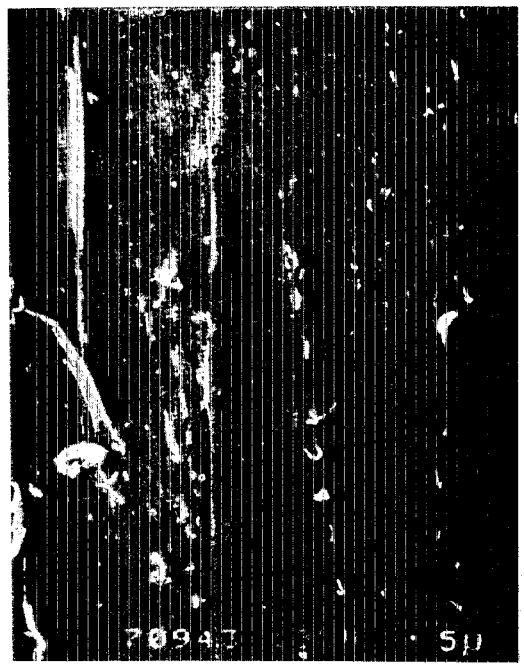
FIGS. 13 (a) to (e) are electron microscope photographs of cross-sections of the samples obtained in Examples Nos. 2 and 5, and Control Nos. 13 and 14 and the sample not stretched (magnified to 2000-fold)
Figure 13B:
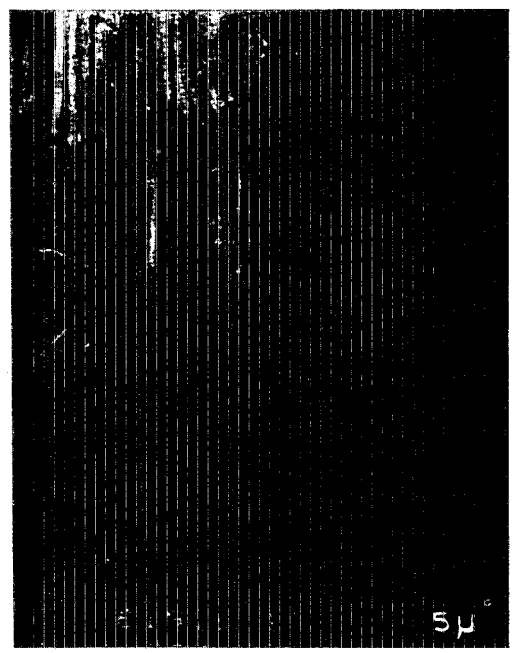
Figure 13C:
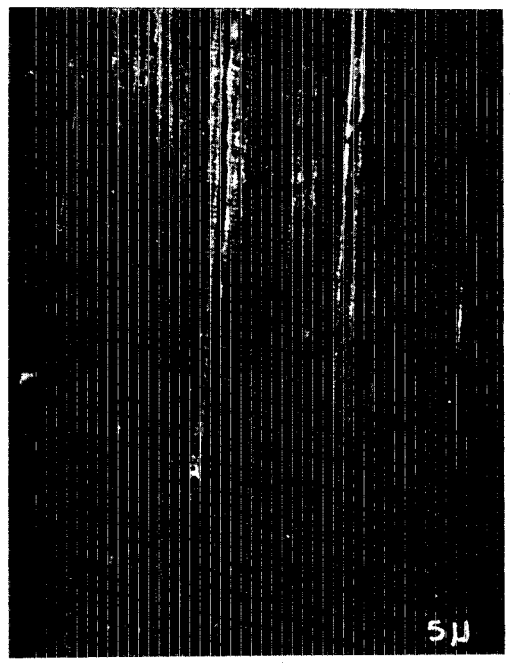
Figure 13D:
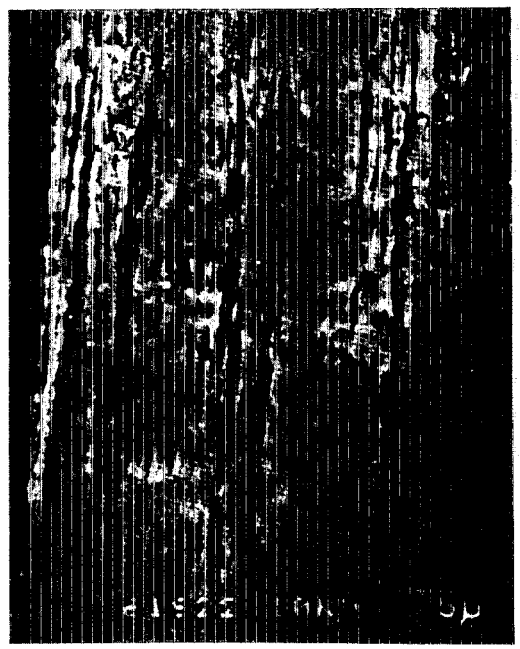
Figure 13E:
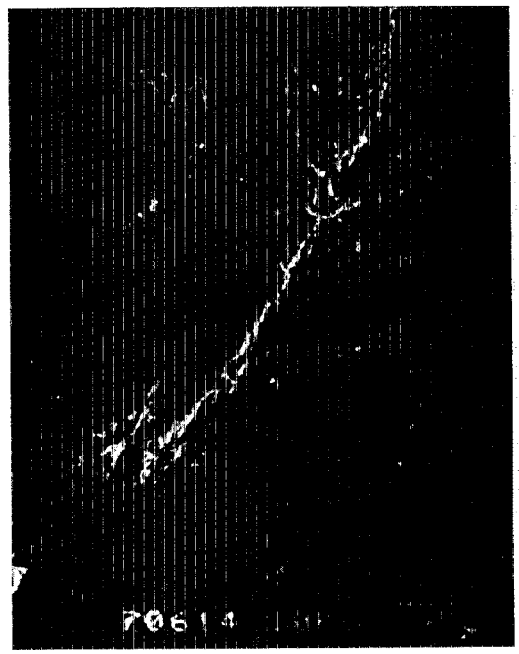

Next, the description is made about the application of the present invention for a polyacetal resin. "Polyacetal resin" as herein mentioned refers to a themoplastic resin which is also called polyoxymethylene, including an acetal copolymer and an acetal homopolymer. When the polyacetal resin is stretched according to the process of the present invention, an excellent material of continuous length can be obtained. That is, there can be obtained a polyacetal of continuous length with high modulus having an apparent density of 1.20 to 1.46 g/cm$^3$, a tensile modulus of 19 GPa or higher and a density change percentage of 85% or more. FIG. 12 as described hereinafter is a graph of the distribution region of the polymer material of the present invention, plotting the tensile moldulus on the abscissa and the density change percentage on the ordinate, namely the region of the tensile modulus $(X) \geqq 19$ GPa and the density change percentage $(Y) \geqq 85\%$. The density change percentage Y (%) is the percent of the apparent density of polyacetal resin after stretching relative to the apparent density before stretching as represented by the following formula:

$$Y = \frac{\text{Apparent density of polyacetal resin after stretching}}{\text{Apparent density of polyacetal resin before stretching}} \times 100(\%)$$

In the above formula, the density, and particularly the density before stretching, refers to the density measured after one gram of polyacetal resin is sampled in a breaker of 50 ml capacity, melted by heating under a nitrogen stream, and left to cool to 20° C. The apparent density after stretching is also determined for the polyacetal resin after stretching under the same conditions for the measurement of the polyacetal resin before stretching. Polyacetal resin may sometimes be blended with other polymers or fillers, if desired, before practically used, but such apparent density means only the density of polyacetal, from which all components other than polyacetal have been removed. The above density change percentage is a parameter by which lowering in density through fibrilation can be judged, and fibrilation can be prevented as this value is higher, indicating excellent physical properties.

First, in the case of the acetal copolymer, the acetal copolymer to be used in the present invention is prepared usually by use of trioxane, which is the trimer of formaldehyde, and polymerizing this with an addition of a cyclic ether having two adjacent carbon atoms such as ethyleneoxide, 1,3-dioxane, etc. with an ion polymerization initiator. As the cyclic ether, in addition to those as mentioned above, there may be employed 1,3-dioxorane, 1,3,5-trioxepane, trimethyleneoxide, pentamethyleneoxide, 1,2-propyleneoxide, 1,2-butyleneoxide, neopentylformal, pentaerythritol diformal, paraaldehyde, tetrahydrofuran, butadienemonooxide, etc. The copolymer usually employed has a molecular weight (in terms of $\overline{M}w$) of some ten thousands to 120,000 [corresponding to melt flow index (MFI) of 1.0 to 20]. This copolymer may be exemplified by those as described above, which is not limitative of the present invention, and generally comprises an oxymethylene copolymer having 85 to 99. 9 mol. % of recurring oxymethylene units and 0.1 to 15 mol. % of —O—R— (wherein R is a divalent group having two or more carbon atoms bonded directly to each other, positioned between two atoms in the chain, specifically an alkyl group, a halo-substituted alkyl group, an aromatic substituted alkyl group; and the side chains in the R group are all inert) occurring sparingly in the chain. Particularly, a copolymer having 90 to 99 mol. % of recurring oxymethylene units is preferred. If the ratio of the oxymethylene units is lower than 85 mol. %, the modulus will be lowered to make it difficult to obtain the polymer material of the present invention. On the other hand, if the ratio of oxymethylene units becomes higher near 100 mol. %, the copolymer will have a modulus substantially the same as that of a homopolymer. When the above copolymer is stretched under a fluid pressure generally within the range of from 10 to 1000 Kg/cm$^2$, preferably from 30 to 800 Kg/cm$^2$, at a temperature of 100° to 190° C., preferably 120° to 170° C., to a high stretching ratio of 10 to 30-fold, preferably 12 to 25-fold, a product with a tensile modulus of 19 GPa or higher and a density change percentage of 85% or more can be obtained.

As can be seen in FIG. 12, the copolymer materials of the present invention (indicated by o) (numbers in the FIG. represent those of Samples) are all included within the region described above, as distinguished clearly from the acetal copolymer materials of the prior art (indicated by Δ). And, in the acetal copolymer of the prior art, for example, the tensile modulus has the maximum value of 18 GPa which has heretofore been known, while the tensile modulus in the case of the present invention is 19 GPa or higher. In the region of lower tensile modulus, the apparent density of the polymeric material before stretching is high and however the density change is not great. On the contrary, in the higher modulus region, as the pressurizing force is increased and the orientation proceeds, an increasing tendency for the apparent density can be observed. When a highly stretched product of the acetal copolymer of the prior art is observed by a microscope, a large number of fibril structures can be observed. In contrast, in the product of the present invention, substantially no such actualized fibril structure can be observed. The relationship between the attainable tensile modulus and the density change percentage will differ also depending on the content of the sub-starting material such as ethyleneoxide contained in the copolymer (hereinafter called the comonomer content), and the copolymer has a higher density change percentage at high tensile modulus as the comonomer content is smaller, namely as the copolymer becomes approximate to the homopolymer, and however the tensile modulus in the region of higher density change percent is lowered as the comonomer content is increased. Such a situation may be explained by the fact that in the homopolymer as hereinafter described, the material of continuous length of the present invention can have a tensile modulus which can reach 45 GPa, while in a copolymer, for example, a copolymer with 4 mol. % comonomer content, the material in continuous length of the present invention has a tensile modulus up to 28 GPa. For example, the material in continuous length of the present invention obtained by stretching a copolymer with a comonomer content of 4 mol. % has a density change percentage of 85 % or higher and a tensile modulus within the range of from 19 to 30 GPa. Among them, those with density change percentages of 90 % or higher and a tensile modulus of 20 to 29 GPa are preferably excellent in transparency, hardness and durability. More preferable are those with density change percentages of 100% or more and a tensile modulus of 20 to 28 GPa.

Referring next to the acetal homopolymer, the acetal homopolymer as mentioned herein refers to a polymer obtained by the homopolymerization of formaldehyde with an ion polymerization initiator, and a polymer having a molecular weight $\overline{M}w$ of 15,000 to 120,000, preferably 25,000 to 100,000, may be generally employed. When the homopolymer is stretched under a fluid pressure generally of 10 to 1000 Kg/cm$^2$, preferably 30 to 800 Kg/cm$^2$, at a temperature of 100° to 190° C., preferably 130° to 180° C., to a high stretching ratio of 10 to 30-fold, preferably 15 to 30-fold, there can be obtained materials of continuous length having dense structures in which generation of voids and fibrilation are inhibited and having high strengths in the direction of molecular orientation such as tensile modulus, tensile strength, tear strength, etc. as well as high strengths in the direction perpendicular to the molecular orientation, namely the transverse direction, such as flexural strength, buckling strength, etc. In the case of polyacrylonitrile, the preferable conditions are a temperature of 100° to 150° C., a pressure of 10 to 500 Kg/cm$^2$ and a stretching ratio of 8-fold or more. In the case of polyethylene, the preferable conditions are a temperature of 70° to 140° C., a pressure of 30 to 500 Kg/cm$^2$ and a stretching ratio of 8-fold or more. In the case of polypropylene, the preferable conditions are a temperature of 100° to 160° C., a pressure of 30 to 500 Kg/cm$^2$ and a stretching ratio of 10-fold or more. In the case of polyethyleneterephthalate, the preferable conditions are a temperature of 160° to 230° C., a pressure of 30 to 500 Kg/cm$^2$ and a stretching ratio of 3-fold or more.

The material of continuous length of the polyacetal homopolymer of the present invention has an apparent density of 1.20 to 1.46 Kg/cm$^2$ and a tensile modulus of 25 to 50 GPa as shown in FIG. 12, which satisfy the following relationship between the tensile modulus X (GPa) and the density change percentage Y (%):

$$Y \geq 110 - 0.5X \qquad (I)$$

As apparent from FIG. 12, the polymer materials of homopolymer of the present invention (indicated by black dots) are all positioned upper of the solid line, as distinguished clearly from the homopolymer of the prior art (indicated by +). And, the polyacetal of the prior art will markedly be lowered in density from the point where the tensile modulus reaches 20 GPa. For example, the density is changed from the unstretched density of 1.42 g/cm$^3$ to 1.23 g/cm$^3$ at the maximum tensile modulus hitherto known of 40 GPa. In contrast, in the case of the material of continuous length of the present invention, the density is constantly higher than the apparent density of the polymer material of the prior art within the range of from 25 to 40 GPa of tensile modulus. Moreover, the material of continuous length obtained in the present invention can have a tensile modulus exceeding 40 GPa, and no such product having a tensile modulus of 40 to 50 GPa has not been known in the prior art. Thus, the polymer material of continuous length of the present invention, while having a high modulus, is not lowered in density, probably because fibrilation by stretching is prevented. In fact, when the highly stretched product of polyacetal of the prior art is observed by a microscope, a large number of fibril structures are observed, while substantially no actualized fibril structure can be seen in the polymer material of continuous length of the present invention.

Also, the material of continuous length of the present invention has the specific feature of being transparent with increased hardness as the density change percentage is higher. And, particularly preferred are those having a density change percentage of 96% or more, tensile moduli of 25 to 45 GPa and tensile strengths of 1.2 GPa or higher. In addition to the above properties, as compared with the stretched product of the prior art, the tensile strength in the stretched direction is higher by 50% and the strength in the transverse direction, for example, the flexural strength is higher by 100%. Further, those having tensile moduli of 25 to 45 GPa and density change percentages of 100% or more are particularly preferred, since marked transparency can be exhibited.

The material of continuous length of polyacrylonitrile obtained according to the process of the present invention has a tensile modulus of 8 GPa or higher, a tensile strength of 0.50 GPa or higher and a density change percentage of 90% or more. Among them, those having tensile moduli of 9 to 13 GPa, tensile strengths of 0.6 to 0.7 GPa and apparent density of 1.17 g/cm$^3$ are preferred.

The material of continuous length of polyethylene obtained according to the process of the present invention has a tensile modulus of 16 to 70 GPa and a density change percentage of 90% or more. Among them, those having tensile moduli of 20 to 50 GPa and a density change percentage of 100% or more preferred.

The material of continuous length of polypropylene obtained according to the process of the present invention has a tensile modulus of 14 to 20 GPa and a density change percentage of 90% or more. Among them, those having tensile moduli of 15 to 20 GPa and a density change percentage of 100% or more are preferred.

The polymeric material of continuous length produced by the process and the device according to the present invention, which is a stretched product prevented from fibrilation and formation of voids and excellent in mechanical properties in the stretched direction as well as in mechanical properties in the direction perpendicular to the stretched direction (transverse direction), can be used for various kinds of high strength materials, strengthening materials and reinforcing materials.

The polyacetal material of the present invention has not only high density, high modulus and high tensile strength, but also is excellent in mechanical strength in the so called transverse direction such as flexural strength, loop strength, buckling strength and fatigue resistance to repeated bending, etc. It can also be worked into any desired shape such as a round rod, a square rod, a profile, a tube, a sheet, a plate, a tape, a filament, a staple fiber, a film, etc. Therefore, it can be utilized in various fields, including, for example, alternatives for rope, cable, wire rope, etc., alternatives for wire, alternatives for metal pipe, tension member for optical fiber for which a low linear coefficient of expansion is required, various kinds of reinforcing materials, various kinds of coating materials, insulating materials, engineering members, tapes for recording, a fishing net, a gut, a fishing gut, a racket, a club shaft, a net for ball park, a fabric, a knit, a strand, etc.

The polyacrylonitrile material in continuous length obtained by the process of the present invention, due to its specific feature of high strength and high modulus, can be utilized for uses such as materials for carbon fiber, and fillers for reinforcement of concrete.

The polyethylene, polypropylene and polyethyleneterephthalate provided by the present invention are useful for rope, a cable, a tension member, various kinds of reinforcing materials, various kinds of coating materials and insulting materials as mentioned above, and the polyethyleneterephthalate may also be used for tapes for recording.

The present invention is described in more detail by referring to the following Examples.

The density in the Examples was measured by the sink-float method according to JIS K-7112 (1980) at 20°±0.5° C. by use of an aqueous solution of anhydrous potassium carbonate. The tensile modulus was measured at 23° C. by means of Vibron III EA Model (produced by Toyo Baldwin Co.).

The tensile strength and the loop strength were measured at 23° C. by means of an Instron tensile testing machine according to JIS K 7113-1981. The cross-sectional area of the stretched product necessary for calculation of these values was calculated from the weight of a sample of a certain length and the density as determined above.

The durability test was conducted according to JIS G-3535 (1977) for a wire rope for an airplane by flexing repeatedly the test sample with a weight of 2 Kg load hanged around a palley of 10$\phi$ in diameter at one round per minute, and the number of rounds before being torn out was determined.

The transparence was measured in terms of the transparency in appearance and haze according to the testing method for transparency of methacrylic resin for airplane: JIS K-6714 (1977).

As to the orientation of the molded material, the cross-section of the molded material when split in parallel to the stretched direction as magnified to 2000-fold by a scanning type electron microscope (Hitachi S 430 Model) was observed, and the small angle X-ray scattering and the wide angle X-ray scattering when irradiated with X-rays in the direction perpendicular to the stretched direction of the molded material were measured by Shimazu Automatic Recording X-ray Diffraction Apparatus VD2 Model (produced by Shimazu Seisakusho K.K.) and X-ray Diffraction Apparatus Model D-3F (produced by Rigaku Denki K.K.), respectively.

EXAMPLES 1-12 and Controls 13 and 14

A tube of 4 mm in outer diameter and 1 mm in inner diameter prepared by extrusion molding of pellets of Duracon M25-04 [registered trade mark of the acetal copolymer produced by Polyplastic K.K., apparent density: 1.41 g/cm$^3$ (at normal pressure), softening point: 162° C. (at normal pressure] was stretched continuously under pressurization by means of the device as shown in FIG. 11 (length at the stretching portion: 2 m; inner diameter: 10 mm). Silicone oil was used as the pressurizing fluid and stretching was effected in two steps to the maximum stretching degree of 25-fold under the treating conditions as shown in Table 1. The stretching in the later stage was performed at a speed within the range of 0.2 to 6 m/min. For the respective samples thus prepared, apparent density, tensile modulus and tensile strength were determined. The results were as shown in Table 1.

Figure 15A:
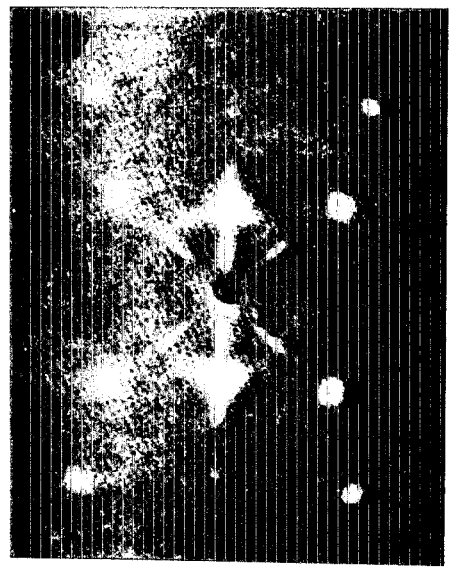
FIGS. 15 (a) to (c) are wide angle X-ray scattering photographs of the same samples as in FIG. 14 (a) to (c) when irradiated with X-rays in the direction perpendicular to the stretched direction.
Figure 15B:
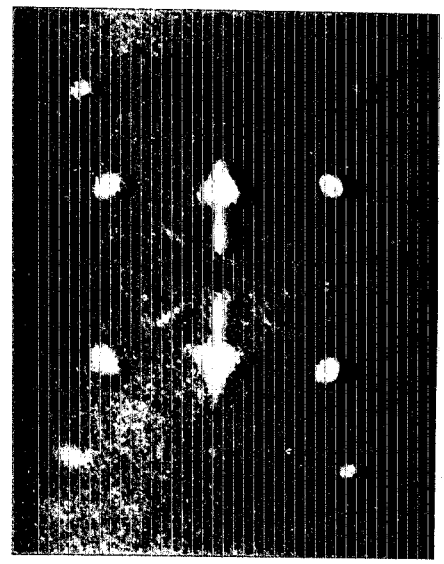
Figure 15C:
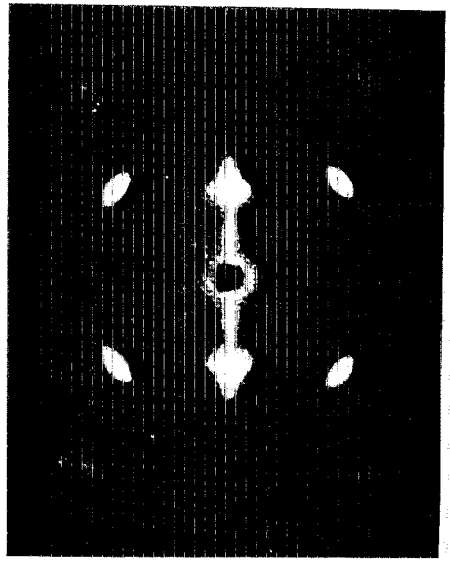

FIGS. 15 (a), (b) and (c) respectively. For the purposes of reference, the electron microscope photograph of the cross-section of the unstretched sample is shown in FIG. 13 (e).

Figure 14A:
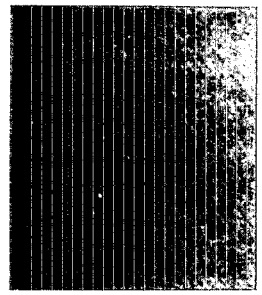
FIGS. 14 (a) to (c) are small angle X-ray scattering photographs of the samples in Examples Nos. 5, 6 and 14 when irradiated with X-rays in the direction perpendicular to the stretched direction.
Figure 14B:
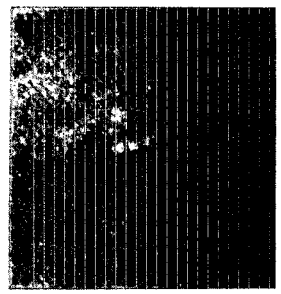
Figure 14C:
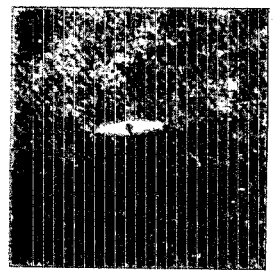

As can clearly be seen from FIG. 13, fibrils are arranged in the stretched direction and a large number of voids exist in the Control samples, while fibrilation and growth of voids are substantially prevented in the Examples. Also, as apparent from FIG. 14 and FIG. 15, streak-like scattering is observed on the equator in small angle X-rays and a concentric ring with spreading of the scattered spots in wide angle are recognized in the Control samples, while scattering on the equator is weak in small angle X-rays and the spots are very small with substantially no concentric ring observed in wide angle X-rays in the Examples. From the facts described above, it can be understood that the molded material of the present invention is prevented from fibrilation, having a dense structure with substantially complete crystallization, and is very high in crystallized orientation in the stretched direction.

TABLE 1

|  | Sample No. | Stretching conditions | | | | Physical properties | | | | | |
|---|---|---|---|---|---|---|---|---|---|---|---|
|  |  | First stage | | Second stage | | | | | | | |
|  |  | Stretching temperature (°C.) | Pressure (Kg/cm$^2$) | Stretching temperature (°C.) | Pressure (Kg/cm$^2$) | Apparent density (g/cm$^3$) | Tensile modulus (GPa) | Tensile strength (GPa) | Loop strength (GPa) | Durability test (times) | Transparency |
| Example | 1 | 140 | 40 | 160 | 200 | 1.42 | 19 | 1.0 | 0.45 | 40,000 | Transparent |
|  | 2 | " | " | " | " | " | 20 | " | " |  | " |
|  | 3 | " | " | " | 300 | 1.44 | 22 | " |  |  | " |
|  | 4 | " | " | 163 | 400 | 1.45 | 25 | " | 0.45 |  | " |
|  | 5 | " | " | " | 350 | 1.44 | 26 | " |  |  | " |
|  | 6 | " | " | " | " | 1.43 | 27 | " |  |  | " |
|  | 7 | " | " | " | 400 | 1.41 | 28 | " | 0.45 |  | Translucent |
|  | 8 | " | " | 160 | 100 | 1.35 | 22 | " | 0.45 |  | White |
|  | 9 | " | " | 163 | 350 | " | 29 | 0.9 |  |  | " |
|  | 10 | " | " | " | 300 | 1.31 | 29.5 | " |  |  | " |
|  | 11 | " | " | 160 | 150 | 1.27 | 26 | 0.8 | 0.40 |  | " |
|  | 12 | " | " | 160 | 500 | 1.20 | 30 | " | 0.34 |  | " |
| Control | 13 | 140 | 1 | 160 | 1 | 1.34 | 18 | 0.75 | 0.40 |  | White |
|  | 14 | " | " | " | " | 1.14 | 20 | 0.6 | 0.26 | 12,000 | " |

For comparative purposes, the results obtained for those stretched under normal pressure were also listed. These results are shown in FIG. 12 as a graph showing the relationship between the tensile modulus (GPa) and the density change percentage (%). As apparent from this graph, the polymeric material of the present invention (shown by ○) exhibits a density change percentage of 85% or more at a tensile modulus in the range of 19 GPa or more, while the acetal copolymer of the prior art (shown by △) falls outside of this range.

As for transparency, Samples No. 1-No. 7 with apparent density of 1.41 g or more were found to be good molded materials with a haze value of 40% or less according to the transparency test method. Next, electron microscope photographs magnified to 2000-fold of the cross-sections in parallel to the stretching direction of the Samples No. 2 and No. 5, which are molded materials of the present invention, and Samples No. 13 and No. 14, which are Control samples, are shown respectively in FIGS. 13 (a), (b), (c) and (d). Small angle X-ray scattering photographs when irradiated with X-ray in the direction perpendicular to the stretching direction of the Samples No. 5, No. 6 and No. 14 in FIG. 14 (a), (b) and (c) respectively, and wide angle X-ray scattering photographs of the Samples No. 5, No. 6 and No. 14 in

EXAMPLE 15-24 AND CONTROLS 25 and 26

A tube (outer diameter: 3 mm; inner diameter: 1 mm) of Tenac 3010 [registered trade mark of the acetal homopolymer produced by Asahi Kasei Kogyo K.K., density: 1.42 g/cm$^3$ (at normal pressure), softening point: 174° C. (at normal pressure)] was stretched in two steps to a stretching ratio of 10 to 35-fold under the treating conditions as shown in Table 2, using silicone oil as the pressurizing fluid. The results of the thus prepared samples are shown in Table 2. For a comparative purposes, the results of those stretched under normal pressure are also given in Table 2. These results are shown in FIG. 12 as a graph of the the relationship between the tensile modulus X (GPa) and the density change percentage Y (%). As is apparent from this graph, the polymer materials of the present invention (indicated by ●) are all within the range of the tensile modulus 25 to 50 GPa and Y≧110–0.5 X, while the polyacetal of the prior art (indicated by +) fall outside of such ranges. Next, when haze values were measured for these samples, Samples No. 15 to No. 19 were transparent with haze values of 40 % or less, while Samples No. 20 and No. 21 were translucent with haze values of 80% or less.

TABLE 2

| | Sample No. | Stretching conditions First stage Stretching temperature (°C.) | Pressure (Kg/cm²) | Second stage Stretching temperature (°C.) | Pressure (Kg/cm²) | Physical properties Apparent density (g/cm³) | Tensile modulus (GPa) | Tensile strength (GPa) | Loop strength (GPa) | Durability test (times) | Transparency |
|---|---|---|---|---|---|---|---|---|---|---|---|
| Example | 15 | 145 | 60 | 160 | 150 | 1.42 | 25 | 1.4 | 0.45 | 40,000 | Transparent |
| | 16 | " | " | " | " | 1.44 | 30 | 1.5 | " | 43,000 | " |
| | 17 | " | " | 168 | 200 | 1.45 | 35 | 1.6 | " | | " |
| | 18 | " | " | 172 | 400 | 1.46 | 40 | 1.7 | " | | " |
| | 19 | " | " | " | " | 1.45 | 42 | 1.7 | | 43,000 | " |
| | 20 | " | " | 176 | 400 | 1.42 | 45 | 1.6 | | | Translucent |
| | 21 | " | " | 160 | 50 | 1.39 | 25 | 1.3 | | | " |
| | 22 | " | " | 172 | 150 | 1.28 | 40 | 1.3 | | | White |
| | 23 | " | " | 180 | 600 | 1.28 | 50 | 1.3 | | | " |
| | 24 | " | " | " | 400 | 1.21 | 50 | 1.0 | | | " |
| Control | 25 | 145 | 1 | 160 | 1 | 1.36 | 25 | 1.1 | 0.25 | 20,000 | White |
| | 26 | " | " | 172 | " | 1.15 | 40 | 0.6 | 0.20 | 12,000 | " |

EXAMPLE 27-30 AND CONTROL 31

Similarly as in Examples 15-24 and Controls 25 and 26, a rod (outer diameter: 6 mm φ) of Tenac 4010 [registered trade mark of the acetal homopolymer produced by Asahi Kasei Kogyo K.K., density 1.42 g/cm³, softening point 174° C. (at normal pressure) was stretched to 10-30-fold. The stretching conditions and the physical properties of the molded materials obtained are shown in Table 3.

Figure 16A:
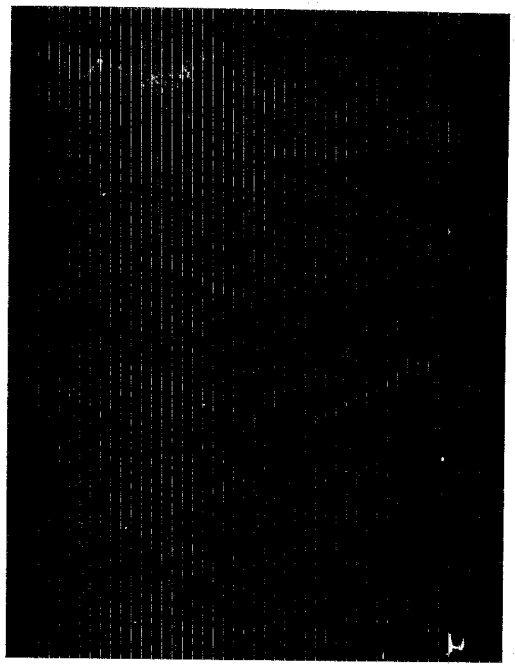
FIGS. 16 (a) and (b) are electron microscope photographs of cross-sections bursted in the direction parallel to the stretched direction of the samples obtained in Examples 28 and Control 31 (magnified to 4000-fold)
Figure 16B:
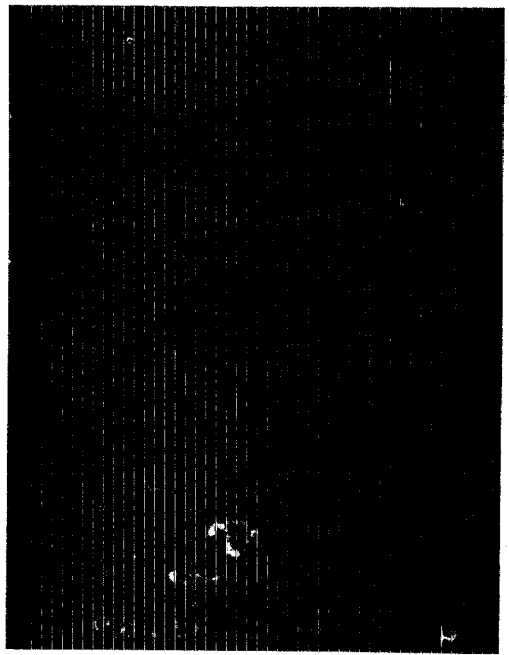
Figure 17A:
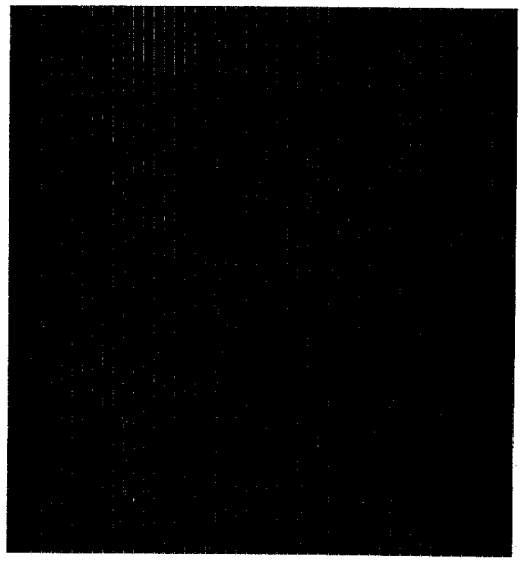
FIGS. 17 (a) and (b) are small angle X-ray scattering photographs of the same samples as in FIGS. 16 (a) and (b) when irradiated with X-rays in the direction perpendicular to the stretched direction.
Figure 17B:
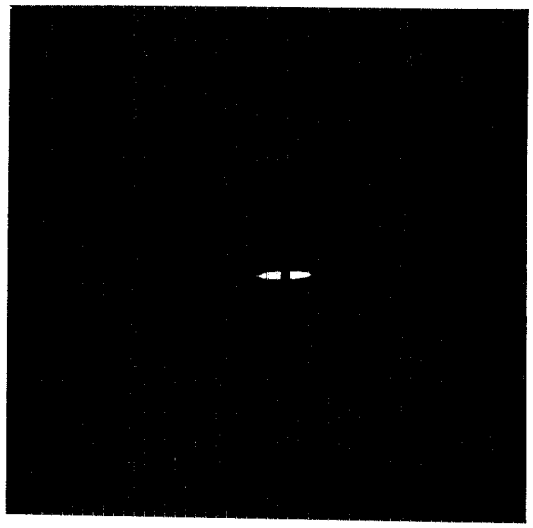
Figure 18A:
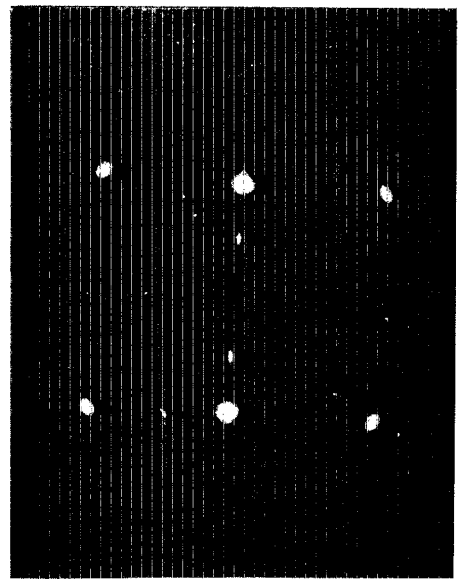
FIGS. 18 (a) and (b) are wide angle X-ray scattering photographs of the same samples as in FIGS. 16 (a) and (b) when irradiated with X-rays in the direction perpendicular to the stretched direction.
Figure 18B:
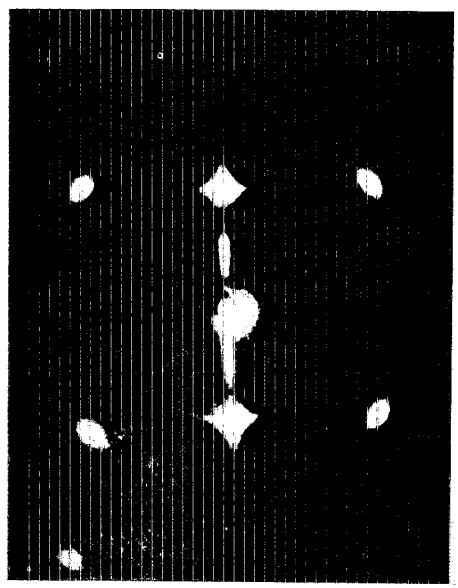

For the above Samples No. 28 and No. 31 (Control), electron microscope photographs magnified to 4000-fold of the cross-section bursted in the direction parallel to the stretched direction are shown in FIGS. 16 (a) and (b), the small angle X-ray scattering charts in FIGS. 17 (a) and (b) and the wide angle X-ray scattering charts in FIGS. 18 (a) and (b). As can be seen from FIGS. 16, 17 and 18, the polymer material of the present invention is prevented from fibrilation, has a dense structure with substantially complete crystallization, and is very high in crystallized orientation in the stretched direction.

EXAMPLE 33

Under the state where a tube of Tenac 3010 (outer diameter 6 mm, inner diameter 1.8 mm) is pressurized at the hollow portion to 50 Kg/cm² by a compressor by introducing positively silicone oil into the hollow portion, the tube was stretched continuously by heating to 150° C. In this case, the pressure outside said tube was maintained at 10 Kg/cm² or 1 Kg/cm².

The product obtained was a transparent tube oriented in the diameter direction with an outer diameter of 3.1 mm and an inner diameter of 2.5 mm.

EXAMPLE 34

A tube of Tenac 3010 (outer diameter: 4 mm; inner diameter: 1 mm) having a wire with an outer diameter of 0.2 mm in the hollow portion thereof was continuously stretched to a stretching ratio of 13-fold under the conditions of an outer pressure of 60 Kg/cm² and a temperature of 170° C. The product obtained was a wire tightly coated with the polyacetal resin. The tensile modulus at the polyacetal portion was found to be 25 GPa.

TABLE 3

| | Sample No. | Stretching conditions First stage Stretching temperature (°C.) | Pressure (Kg/cm²) | Second stage Stretching temperature (°C.) | Pressure (Kg/cm²) | Physical properties Apparent density (g/cm³) | Tensile modulus (GPa) | Tensile strength (GPa) | Loop strength (GPa) | Transparency |
|---|---|---|---|---|---|---|---|---|---|---|
| Example | 27 | 150 | 100 | 166 | 800 | 1.28 | 50 | 1.3 | 0.35 | White |
| | 28 | " | " | 165 | 500 | 1.42 | 45 | 1.5 | 0.45 | Transparent |
| | 29 | " | " | 163 | 300 | 1.36 | 45 | 1.4 | 0.35 | Translucent |
| | 30 | " | " | 155 | 100 | 1.42 | 25 | 1.1 | 0.25 | Transparent |
| Control | 31 | " | 1 | 163 | 1 | 1.25 | 35 | 1.0 | 0.15 | White |

EXAMPLE 32

Similarly as described in Examples 15-24, a tape (thickness 1 mm, width 15 mm) of Tenac 5010 [registered trade mark of the acetal homopolymer produced by Asahi Kasei Kogyo K.K., density: 1.42 g/cm³, softening point: 174° C. (at normal pressure)] was stretched to 12-35-fold under the conditions of a pressure of 100 to 400 Kg/cm² and a temperature of 160° to 180° C., using silicone oil as the pressurizing fluid. The products obtained were thin films having a tensile modulus within the range of from 25 to 50 GPa and apparent density within the range of from 1.21 to 1.46 g/cm³, and those with apparent an density of 1.42 g/cm³ or higher exhibited transparency.

EXAMPLE 35

An unstretched Cashimilon fiber (3000 filaments; monofilament: 40 denier) was stretched in polyethylene glycol (molecular weight: 400) at a temperature of 130° C. and a pressure of 100 Kg/cm². The product obtained was a transparent material having a tensile strength at break of 75 Kg/mm², a tensile modulus of 1300 Kg/mm², an elongation of 8% and an apparent density of 1.17 g/cm³. The Control obtained by stretching under normal pressure had a tensile strength at break of 40 Kg/mm², a tensile modulus of 760 Kg/mm², an elongation of 16%. Thus it is proved that the product of the present invention is superior to the Control samples.

EXAMPLE 36

A high density polyethylene sheet produced by Asahi Kasei Kogyo K.K. ($\overline{Mw}32$ 300,000; apparent density: 0.95 g/cm$^3$; softening point: 125° C. melting point 132°–135° C.; width 20 mm; thickness: 1 mm) was stretched to about 8–16-fold under a fluid pressure of 300 Kg/cm$^2$ (employing mixture of fluids containing 50 wt. % of decalin and 50 wt. % of silicone oil) at 120° C. Transparent stretched products with apparent densities of 0.95 to 0.96 g/cm$^3$ and tensile moduli of 20 to 50 GPa were obtained. The Controls obtained by stretching under the same conditions as above except under normal pressure were found to have an apparent density of 0.95 g/cm$^3$ or less and a tensile modulus of 14 GPa at best.

EXAMPLE 37

A high density polyethylene sheet produced by Asahi Kasei Kogyo K.K. ($\overline{Mw}32$ 3,000,000; apparent density: 0.95 g/cm$^3$; softening point: 130° C.; melting point: 135°–137° C.; width 20 mm; thickness: 1 mm) was stretched to about 10–15-fold under a fluid pressure of 400 Kg/cm$^2$ (employing mixture of fluids containing 50 wt. % of decalin and 50 wt. % of silicone oil) at 130° C. Transparent stretched products with apparent densities of 0.95–0.96 g/cm$^3$ and tensile moduli of 16 to 32 GPa were obtained. The Controls obtained by stretching under the same conditions except under normal pressure were found to have an apparent density of 0.95 g/cm$^3$ or less and a tensile modulus of 15 GPa at best.

EXAMPLE 38

A polypropylene sheet ($\overline{Mw}32$ 200,000; apparent density: 0.90 g/cm$^3$; softening point: 150° C.; melting point: 170° C.; width 20 mm; thickness: 1 mm) was stretched to about 10–16-fold under a pressure of 400 Kg/cm$^2$ of silicone oil at 136° C. Transparent stretched products with apparent densities of 0.90 to 0.91 g/cm$^3$ and tensile moduli of 14 to 20 GPa were obtained. The Controls obtained by stretching under the same conditions except under normal pressure were found to have an apparent density of 0.90 g/cm$^3$ or less and a tensile modulus of 13 GPa at best.

EXAMPLE 39

A polyethyleneterephthalate film having a tensile modulus of 4 GPa (apparent density: 1.41 g/cm$^3$; softening point: 220° C.; melting point: 260° C.; width. 10 mm; thickness: 50 $\mu$) (produced by Teijin K.K.) was stretched to 3-fold under a pressure of 400 Kg/cm$^2$ of silicone oil at 208° C. to obtain a transparent film with a width of 4 mm and a thickness of 40 $\mu$, having an apparent density of 1.42 g/cm$^3$ and a tensile modulus of 15 GPa. When the same stretching is effected for comparative purposes under the same conditions except at normal pressure, the product obtained had an apparent density of 1.41 g/cm$^3$ or less and a tensile modulus of 10 GPa.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for producing a polymeric material of continuous length of high strength and high modulus, which comprises allowing a polymeric material of continuous length to pass through a pressurizing fluid, to apply substantially uniform pressure therearound, and applying a drawing stress to the material while heating it at a temperature not exceeding its softening point, thus subjecting the material continuously to high stretching.

2. A process according to claim 1, wherein the pressurizing fluid is a liquid.

3. A process according to claim 1, wherein the pressure of the pressurizing fluid is 10 to 1000 Kg/cm$^2$.

4. A process according to claim 1, wherein the pressure of the pressurizing fluid is 30 to 800 Kg/cm$^2$.

5. A process according to claim 1, wherein the stretching is effected at a ratio of natural stretching ratio region or higher.

6. A process according to claim 1, wherein the polymeric material of continuous length is polyacetal.

7. A process according to claim 1, wherein the polymeric material of continuous length is a copolymer of polyacetal.

8. A process according to claim 1, wherein the polymeric material of continuous length is polyacrylonitrile.

9. A polyacetal copolymer of continuous length, having an apparent density of 1.20 to 1.46 g/cm$^3$, and tensile modulus of 19 GPa or more and a density change percentage of 85% or more, the relationship between the density change percentage (Y) and the tensile modulus (X) being defined by the relationship:

when $19 \leq X \leq 30$ then $Y \geq 127.7 - 1.42X$ and when $X > 30$, $Y \geq 85$.

10. A copolymer of polyacetal in continuous length according to claim 9, wherein the comonomer content of polyacetal is 0.1 to 15 mol. %.

11. A copolymer of polyacetal in continuous length according to claim 10, wherein the comonomer content of polyacetal is 1 to 10 mol. %, having a tensile modulus of 19 to 30 GPa and a density change percentage of 85% or more.

12. A copolymer of polyacetal in continuous length according to claim 10, wherein the comonomer content of polyacetal is 1 to 10 mol. %, having a tensile modulus of 20 to 29 GPa and a density change percentage of 90% or more.

13. A copolymer of polyacetal in continuous length according to claim 10, wherein the comonomer content of polyacetal is 1 to 10 mol. %, having a tensile modulus of 20 to 28 GPa and a density change percentage of 100 % or more.

* * * * *